United States Patent [19]

Okumura et al.

[11] Patent Number: 5,480,733
[45] Date of Patent: Jan. 2, 1996

[54] METAL THIN FILM MAGNETIC RECORDING MEDIUM

[75] Inventors: Yoshinobu Okumura; Xingbo Yang; Isao Endo, all of Osaka, Japan

[73] Assignee: Kubota Corporation, Osaka, Japan

[21] Appl. No.: 208,958

[22] Filed: Mar. 11, 1994

[30] Foreign Application Priority Data

Mar. 15, 1993 [JP] Japan .......................... 054155

[51] Int. Cl.$^6$ .................. H01F 1/00; B32B 9/00; G11B 5/66; G11B 5/70
[52] U.S. Cl. ............... 428/694 T; 428/611; 428/660; 428/666; 428/667; 428/336; 428/694 TS; 428/694 TC; 428/900
[58] Field of Search .................. 428/336, 433, 428/660, 666, 667, 680, 900, 611, 928, 694 T, 694 TS, 694 TP, 694 TC, 695 TF; 204/192.2

[56] References Cited

U.S. PATENT DOCUMENTS

| | | | |
|---|---|---|---|
| 4,224,381 | 9/1980 | Patel et al. | 428/652 |
| 4,749,459 | 6/1988 | Yamashita et al. | 204/192.15 |
| 4,786,564 | 11/1988 | Chen et al. | 428/694 |
| 5,037,515 | 8/1991 | Tsai et al. | 204/192.15 |
| 5,084,152 | 1/1992 | Lin | 204/192.15 |
| 5,314,745 | 5/1994 | Okumura | 428/336 |

FOREIGN PATENT DOCUMENTS 2049216 2/1990 Japan.
2246017 12/1990 Japan.

OTHER PUBLICATIONS

Andriatis, A. K., "Experimental Studies of Sputtered Thin Film disk with Cobalt–Nickel chromium magnetic layer and Cr underlayer," Mater. Sci. Forum, 62–64, 601–602.
IEEE Transactions On Magnetics, vol. 27, No. 6, Nov. 1991, T. Yamashita, et al., "Sputtered NixP Underlayer For CoPt–Based Thin Film Magnetic Media", pp. 4727–4729.

Primary Examiner—Paul J. Thibodeau
Assistant Examiner—Stephen Sand
Attorney, Agent, or Firm—Oblon, Spivak, McClelland, Maier, & Neustadt

[57] ABSTRACT

The present invention provides a metal thin film magnetic recording medium in which an underlying Cr layer, a magnetic recording layer and a protection layer are laminated in this order on a non-magnetic medium substrate. The medium substrate comprises an NiPX layer laminated in this order on a non-metallic base plate such as a glass base plate or a carbon base plate. X is one or mope elements belonging to a group of 4, 5 and 6 in a periodic table, and the content X is less than 20 at % in total. A heat accumulating non-magnetic layer having excellent heat conductivity may be formed on the non-metallic base plate and laminated between the NiPX layer thereon.

10 Claims, 1 Drawing Sheet

METAL THIN FILM MAGNETIC RECORDING MEDIUM

FIELD OF THE INVENTION AND RELATED STATEMENT

The present invention relates to a magnetic recording medium for use in magnetic disc apparatus.

In recent years, metal thin film magnetic recording media in which a Co alloy having a uniaxial crystal magnetic anisotropy such as uni-CoNiCr or-CoCrTa is laminated by way of an underlying Cr layer on a non-magnetic medium substrate have been used along with the increase in the recording density of magnetic recording media.

Heretofore, an NiP layer–Al alloy base plate in which an amorphous NiP plating layer of 10–20 μm is formed on an aluminum alloy (Al alloy)-base plate for ensuring rigidity has been used as a medium substrate. Circumferential unevenness referred to as a texture has been mechanically formed to the surface by a lapping tape or free grain in order to moderate contact between the medium surface and a magnetic head and improve the durability. The mechanical texture contributes not only to the improvement of the durability but also has a function of aligning the crystal graphic axis of the Co alloy in the circumferential direction, as well as it also contributes to the improvement of a coercive force.

However, since the Al alloy base plate is a soft material and a liable to suffer from plastic deformation, it is poor in the flatness as the base plate. Further, since irregular protrusions are caused upon forming the mechanical texture, it is difficult to reduce the glide height of the magnetic head. In view of the above, a glass base plate of high hardness and excellent flatness has also been used. Use of the glass base plate can reduce rising amount of the head to less than 0.05 μm and improve the recording density. An isotropic texture comprising fine unevenness formed at random has usually been formed by a protrusion forming means such as chemical etching of sputtering to the surface of the glass base plate.

However, when the underlying Cr layer is formed directly to the glass base plate and a Co alloy layer and a protection layer are successively laminated, the coercive force is reduced by about 300 to 600 Oe as compared with a case of forming each of the layers to the conventional NiP layer–Al alloy base plate. This is because no improvement can be expected for the crystal orientation of the underlying Cr layer by the NiP layer when the glass base plate is used. Further, although the coercive force is improved by laminating the underlying Cr layer or the magnetic recording layer while heating the surface of the base plate, the temperature at the surface of the base plate is less elevated when the surface of the base plate is heated by an infrared heater (IR heater) or the like since glass has lower infrared absorption coefficient and low heat conductivity as compared with the Al alloy.

In view of the above, a substrate in which an NiP layer is formed by sputtering or plating to a glass base plate has been proposed as a medium substrate. In this instance, since the flatness of the glass base plate is more excellent over the Al alloy base plate, the glide height of the magnetic head can be lowered to improve the recording density also in a case of forming a circumferential texture at the surface of the NiP layer than in a case of using the Al alloy base plate.

OBJECT AND SUMMARY OF THE INVENTION

However, even if a glass base plate having a NiP layer formed thereon is used as the medium substrate, no improvement can be attained as expected for the coercive force of the Co alloy layer. In a case of forming the underlying Cr layer, Co alloy layer or the like, for example, to an NiP layer–Al alloy base plate, the surface of the NiP layer is heated as described above in order to improve the coercive force. However, since glass has smaller infrared absorption coefficient and lower heat conductivity as compared with Al alloy, if the NiP layer - glass base plate is used temperature of the NiP layer is elevated rapidly by which amorphous texture is crystallized. Then, the crystal orienting property of the amorphous NiP layer is deteriorated to disturb crystals of the underlying Cr layer and, thus, the Co alloy layer, to lower the coercive force. Further, since the crystallized NiP has a magnetic property, R/W characteristic is deteriorated. Therefore, the heating temperature to the surface of the NiP layer is restricted to about 200°–300° C. Heating of the NiP layer while preventing crystallization thereof can be attained by lowering the heating temperature which, however, accompanies lowering of the coercive force and the coercive force can not be improved.

The present invention has been achieved in view of the foregoing problems and it is an object thereof to provide a metal thin film magnetic recording medium having both satisfactory flatness and high coercive force, as well as a manufacturing method thereof.

The metal thin film magnetic recording medium according to the present invention is a magnetic recording medium wherein an underlying Cr layer, a magnetic recording layer and a protection layer are laminated in this order on a non-magnetic medium substrate, wherein the medium substrate comprises a NiPX layer laminated on a non-metallic base plate in this order, wherein X consists of one or more elements belonging to a group of IVB, VB and VIB in a periodic table with a content thereof being less than 20 at % in total. In this case, a heat accumulating non-magnetic layer having excellent heat conductivity is preferably laminated between the non-metallic base plate and the NiPX layer.

Further, the method of manufacturing a metal thin film magnetic recording medium according to the present invention comprises the steps of laminating a NiPX layer, wherein X consists of one or more elements belonging to a group of IVB, VB and VIB in a periodic table with a content thereof being less than 20 at % in total, on a non-metallic base plate in this order by sputtering to prepare a medium substrate, and laminating an underlying Cr layer, a magnetic recording layer and a protection layer in this order on the medium substrate by sputtering. A heat accumulating magnetic layer having excellent heat conductivity is, preferably, formed by sputtering on the non-metallic base plate, on which the NiPX layer is laminated.

According to the present invention, since one or more elements belonging to a group of IVA, VA and VIA in a periodic table, namely, Ti, V, Cr, Zr, Nb, Mo, Hf, Ta and W is selected as X in the NiPX layer formed instead of the conventional NiP layer, crystallizing temperature of NiPX can be increased as compared with NiP. This can increase the substrate temperature upon lamination of the underlying Cr layer or the like as compared with a case of forming the NiP layer and thus improve the coercive force.

Further, although no detailed reasons have yet been apparent, when the NiPX layer is formed, Cr crystal orientation (in this case "100" orientation) in the underlying Cr layer formed on this surface is made more uniform than the case of the NiP layer. Therefore, the magnetic property of the magnetic recording layer formed on the underlying Cr layer (squareness ratio and anisotropy) is improved. Accordingly, if Br.δ is constant, head reproducing output is improved more than in a case of the NiP layer.

In this case, the X content is preferably restricted to less than 20 at % in total. This is because the crystallization temperature tends to rather lower if the content exceeds 20 at %. If the X content is insufficient, the function of improving the crystallizing temperature becomes alsoinsufficient and, accordingly, X is preferably contained by more than 4 at %.

Furthermore, since the heat accumulating non-magnetic layer having excellent heat conductivity is formed on the non-metallic base plate, on which the NiPX layer is formed, not only the NiPX layer but also the heat accumulating non-magnetic layer are heated rapidly upon heating the base plate, so that temperature elevation of the NiPX layer can be suppressed, thereby enabling to prevent crystallization of the NiPX layer and, thus, reduction of the coercive force of the magnetic recording layer more effectively. Furthermore, since the heat accumulating non-magnetic Layer is disposed as compared with the case of using only the NiPX layer, heat possessing capacity is increased, which can suppress temperature lowering during lamination of the underlying Cr layer or the magnetic recording layer, thereby contributing to the improvement of the coercive force.

BRIEF DESCRIPTION OF THE DRAWINGS

In the accompanying drawings.

DETAILED DESCRIPTION OF THE PREFERRED EMBODIMENTS

Figure 1:
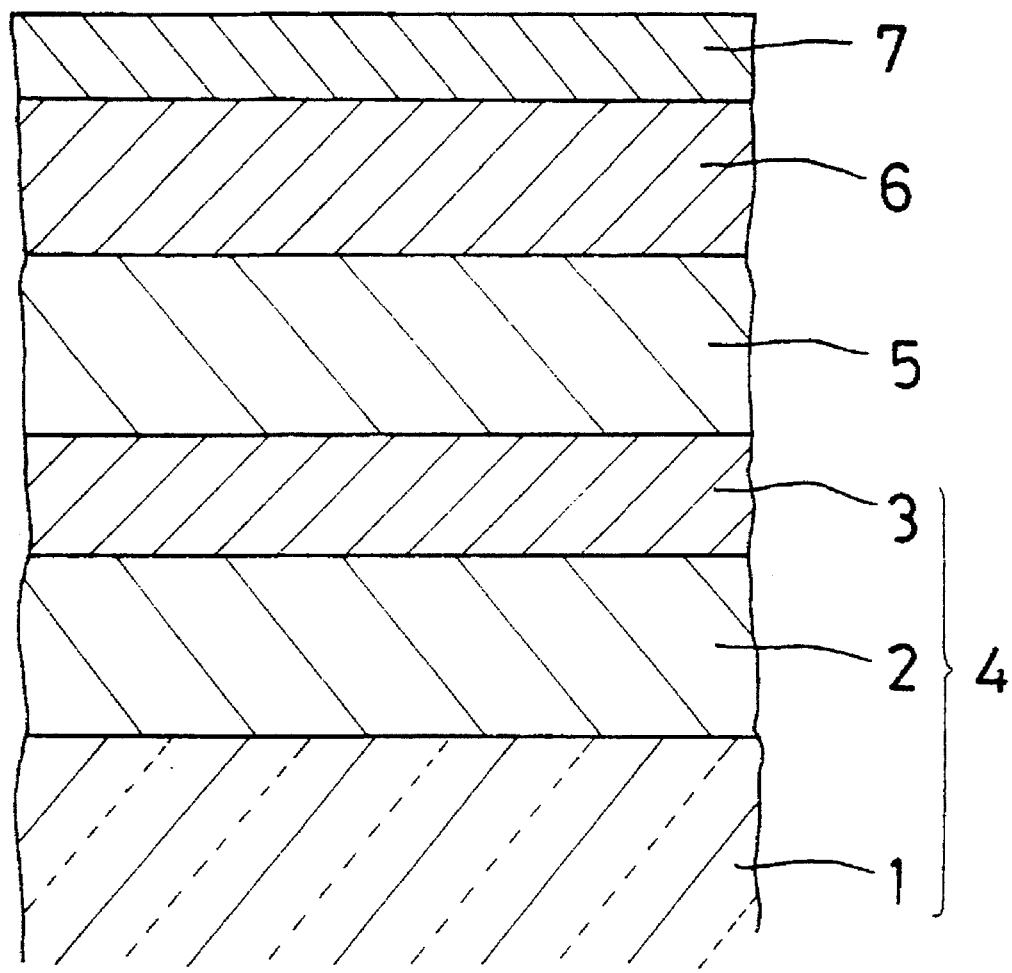
FIG. 1 is a cross sectional view of a principal part of a magnetic recording medium according to the present invention.

FIG. 1 is a cross sectional view of a principal part of a magnetic recording medium according to a preferred embodiment, in which a heat accumulating non-magnetic layer 2, an NiPX layer 3, an underlying Cr layer 5, a magnetic recording layer 6 and a non-magnetic protection layer 7 are formed in this order on a glass base plate 1 as a non-metallic base plate. The glass base plate 1, the heat accumulating non-magnetic layer 2 and the NiPX layer 3 constitute a medium substrate 4. Although the glass base plate is used as the non-metallic base plate in this embodiment, it is not limitative but, for example, a carbon base plate and a ceramic base plate may also be used. The above-mentioned base plates are also hard like that the glass base plate and the surface thereof can be fabricated flat and smooth.

The surface of the glass base plate 1 is polished smoothly, and the heat accumulating non-magnetic layer 2 laminated thereon is formed with a metal material having excellent heat conductivity and heat accumulating property, for example, one or more alloys of metals selected, for example, from Cr, Ti, Zr, Hf, V, Nb, Mo, W and Ta. The thickness of the heat accumulating non-magnetic layer 2 is preferably about 300 to 2,000Å. If the thickness is less than 300Å, the heat possessing capacity is small making it difficult to maintain the temperature of the NiPX layer 3 to higher than about 250° C. during lamination of the Cr underlying layer 5 or the magnetic recording layer 6 on the medium substrate 4. On the other hand, if the thickness exceeds 2,000Å, large unevenness is formed on the surface of the layer. Formation of the heat accumulating non-magnetic layer 2 can provide an effect of suppressing the temperature elevation of the NiPX layer 3 upon heating the substrate, as well as a function of causing the NiPX layer 3 to firmly adhere to the glass base plate 1 by way of the heat accumulating non-magnetic layer 2 and less peels therefrom. In the present invention, the NiPX layer 3 may be formed directly to the glass base plate 1 without forming the heat accumulating non-magnetic layer 2.

As described previously, one or more elements belonging to a group of IVA, VA and VIA in a periodic table, namely, one or more of Ti, V, Cr, Zr, Nb, Mo, Hf, Ta and W which are high melting metals is selected as X in the NiPX layer 3, and the content thereof is defined, preferably, to more than 4 at % and less than 20 at % in total. The P content is from 10 (preferably 14) to 27 at %. If it is less than 10%, the crystallizing temperature is too low. On the other hand, if it is greater than 14 at %, the crystallizing temperature exceeds 300° C. at the X content of greater than 4 at % to enable heating at a higher temperature than usual. On the other hand, if it exceeds 27 at %, manufacture of the NiPX alloy becomes difficult.

A circumferential texture is applied by mechanical means, if necessary, on the NiPX layer 3. Since the texture comprises unevenness of about 100Å, the thickness of the NiPX layer 3 is preferably about greater than 250Å so that the heat accumulating non-magnetic layer 2 is not exposed by the texture. There is particular restriction for the upper limit, the thickness is relatively large in a case when the NiPX layer 3 is formed not by sputtering but by plating. Also in this case, the thickness may be less than about 1,000Å. In a case when more importance is attached to the reduction of the glide height of magnetic head, there is no requirement for disposing the mechanical texture but it may suffice to form an isotropic texture on the surface of the glass base plate 1. In a case when the NiPX layer is formed directly on the glass base plate, a non-magnetic layer for improving the depositability made of the same material as that of the heat accumulating non-magnetic layer is preferably formed on the surface of the glass base plate. This is particularly, this is effective fop such a large thickness of the NiPX layer as exceeding 1,000Å. It will suffice that the non-magnetic layer for improving the depositability is a continuous film and the thickness of less than 300Å is sufficient.

The underlying Cr layer 5 is formed for inplane orientation of C axis (crystal axis showing magnetic anisotropy) of the Co alloy showing uniaxial crystal magnetic anisotropy (crystal structure hcp) of the magnetic recording layer 6 formed thereon and it is usually formed to a thickness of about 300 to 2,000Å.

The magnetic recording layer 8 is formed, as described previously, with the Co alloy showing uniaxial crystal magnetic anisotropy such as CoNiCF, CoCrTa and CoCrPt. The magnetic recording layer is not always restricted to a single Co alloy layer but a composite layer comprising a Co alloy layer and a Cr layer laminated alternately (with the Co alloy layer as the uppermost layer) may also be used. The thickness of the magnetic recording layer 6 (the thickness of the layer itself if it is a single Co alloy layer, or the total thickness of Co alloy layers if it is a composite layer) is usually from 250 to 800Å. This is because a magnetic recording medium having about 100 to 500 G.μ is demanded as the magnetic recording medium.

A non-magnetic protection layer 7 made of carbon or the like is formed to a thickness of about 100 to 400Å on the magnetic recording layer 6, on which a lubricant such as fluorinated polyether may be coated to a thickness of about 10–50Å to form a lubricant layer.

The medium substrate 4 is usually manufactured efficiently by forming the heat accumulating non-magnetic layer 2 and the NiPX layer 3 by sputtering on the glass base plate 1 but the NiPX layer 3 may be formed also by plating. When the underlying Cr layer 5 and the magnetic recording layer 6 are formed on the medium substrate 4, the surface of the NiPX layer 3 is heated, for example, by an infrared heater. While the heating temperature can be increased as compared with the case of NiP, it is desirably kept to lower than about 500° C., preferably, lower than 50° C. in order to the maintain the flatness of the substrate. The entire medium substrate may be heated also by an ohmic heater or the like. As a means for forming the underlying Cr layer 5, the magnetic recording layer 6 and the carbon type protection layer 7 after heating the substrate, sputtering having high film-forming efficiency is generally adopted but other physical vapor deposition process may also be utilized.

Description will be made to concrete examples.

(1) A medium substrate 4 was prepared using a DC magnetron sputtering device by forming an NiPX layer 3 to a thickness of 500Å onto a glass base plate made of crystalline glass having an isotropic texture at a roughness Rmax of 100 to 140 formed on the side on which films are to be laminated, directly or after forming a heat accumulating non-magnetic layer 2 made of a Cr layer to a thickness of 1,000Å. Table 1 below shows presence or absence of the heat accumulating non-magnetic layer (heat accumulation layer) and the composition of the NiPX layer.

(2) For several medium substrates 4, mechanical texturing was applied circumferentially to the surface of the NiPX layer and then the surface was cleaned. Table 1 shows presence or absence of mechanical texture together.

(3) Using the medium substrate 4, and by the same sputtering device (1) as above, the surface of the substrate was heated by an infrared heater, and there were laminated the underlying Cr layer 5 to 1,200Å, the magnetic recording layer (single Co alloy layer) 6 to 250–400Å and the carbon protection layer 7 to 200 Å. The composition of the Co alloy and the substrate heating temperature are as shown in Table 1. Upon forming the underlying Cr layer 5 and the Co alloy layer 6, a negative bias voltage (−100 V and −200 V) was applied on the substrate. In the Table, specimens Nos. 1–17 show examples of the present invention and No. 18 shows a conventional example.

TABLE 1

| Specimen No. | Medium substrate ||||| Magnetic recording layer || Magnetic property ||
|---|---|---|---|---|---|---|---|---|---|
| | Heat accumulating layer | NiPX layer composition (at %) || Mechanical texture | Substrate temperature (°C.) | Composition | Thickness (Å) | Coercive force Hc (Oe) | Anisotropy Hc (C)/Hc (R) |
| | | P | X | | | | | | |
| 1 | — | 18 | Mo 6 | — | 360 | A | 400 | 1500 | 1.0 |
| 2 | O | 18 | Mo 6 | — | 360 | A | 400 | 1580 | 1.0 |
| 3 | O | 18 | Mo 6 | O | 360 | A | 400 | 1750 | 1.69 |
| 4 | — | 18 | Mo 6 | — | 400 | A | 400 | 1560 | 1.0 |
| 5 | — | 18 | W 7 | — | 400 | A | 400 | 1490 | 1.0 |
| 6 | O | 18 | W 7 | — | 400 | A | 400 | 1590 | 1.0 |
| 7 | O | 18 | W 7 | O | 400 | A | 400 | 1790 | 1.61 |
| 8 | O | 17 | Nb 6 | — | 400 | A | 400 | 1620 | 1.0 |
| 9 | O | 17 | Nb 6 | O | 400 | A | 400 | 1840 | 1.65 |
| 10 | — | 13 | Ta 10 | — | 400 | A | 400 | 1510 | 1.0 |
| 11 | — | 17 | Ta 10 | — | 400 | A | 400 | 1530 | 1.0 |
| 12 | — | 22 | Ta 10 | — | 400 | A | 400 | 1550 | 1.0 |
| 13 | O | 17 | Ta 7 | — | 440 | A | 400 | 1670 | 1.0 |
| 14 | O | 17 | Ta 10 | — | 440 | A | 400 | 1730 | 1.0 |
| 15 | O | 17 | Ta 10 | — | 440 | B | 400 | 2110 | 1.0 |
| 16 | O | 17 | Ta 10 | — | 440 | B | 320 | 2320 | 1.0 |
| 17 | O | 17 | Ta 10 | — | 440 | B | 250 | 2460 | 1.0 |
| 18 | — | 20 | — | O | 300 | A | 400 | 1350 | 1.17 |

(Note):
Balance of the composition: Ni, O:presence, —: absence
Composition of the magnetic recording layer (at %)
A: Co-10%Cr-4%Ta
B: Co-10%Cr-6%Pt-4%Ta (4) Using the thus obtained specimens, coercive force and anisotropy were measured. The results are also shown in the table. It can be seen from the table that the substrate heating temperature can be increased to about 400° C. in the examples, which provide remarkable improvement of the coercive force as compared with conventional example. Further, when examples having heat accumulating non-magnetic layer and examples having no such layer are compared, examples having the heat accumulating non-magnetic layer show improved coercive force. For example, when the specimens No. 1 and No. 2 are compared with each other, No. 2 shows higher coercive force. Furthermore, when examples having the mechanical texture are compared with examples having no such texture, examples having the mechanical texture show increased anisotropy and improved coercive force. For example, when specimens No. 2 and No. 3 are compared with each other, No. 3 shows a higher coercive force.

What is claimed is:

1. A metal thin film magnetic recording medium wherein an underlying Cr layer, a magnetic layer and a protection layer are laminated in this order on a non-magnetic medium substrate, wherein said medium substrate comprises a NiPX layer laminated on a non-metallic base plate in this order, wherein X consists of one or more elements belonging to a group of IVB, VB and VIB in a periodic table with the content thereof being less than 20 at % in total, wherein said NiPX layer has a thickness of 250Å to 1000Å.

2. A metal thin film magnetic recording medium as defined in claim 1, wherein the P content in the NiPX layer is from 10 to 27 at %.

3. A metal thin film magnetic recording medium as defined in claim 1, wherein the P content in the NiPX layer is from 15 to 27 at % and the X content is from 4 to 20 at % in total.

4. A metal thin film magnetic recording medium as defined in claim 1, wherein the magnetic recording layer is made of a Co alloy having a uniaxial crystal magnetic anisotropy and a lubricant layer is formed on the protection layer.

5. A metal thin film magnetic recording medium as defined in claim 4, wherein an isotropic texture is formed on a surface of the non-metallic base plate.

6. A metal thin film magnetic recording medium wherein an underlying Cr layer, a magnetic recording layer and a protection layer are laminated in this order on a non-magnetic medium substrate, wherein said medium substrate comprises a heat accumulating non-magnetic layer and a NiPX layer, laminated in this order on a non-metallic base plate, wherein X consists of one or more elements belonging to a group of IVB, VB and VIB in a periodic table with a content thereof being less than 20 at % in total, wherein said NiPX layer has a thickness of 250Å to 1000Å.

7. A metal thin film magnetic recording medium as defined in claim 6, wherein the P content in the NiPX layer is from 10 to 27 at %.

8. A metal thin film magnetic recording medium as defined in claim 6, wherein the P content in the NiPX layer is from 15 to 27 at % and the X content is from 4 to 20 at % in total.

9. A metal thin film magnetic recording medium as defined in claim 6, wherein the magnetic recording layer is made of a Co alloy having a uniaxial crystal magnetic anisotropy and a lubricant layer is formed on the protection layer.

10. A metal thin film magnetic recording medium as defined in claim 9, wherein an isotropic texture is formed on a surface of the non-metallic base plate.

* * * * *